(12) United States Patent
Iyer

(10) Patent No.: US 8,621,215 B1
(45) Date of Patent: Dec. 31, 2013

(54) METHODS AND SYSTEMS FOR CREATING MONETARY ACCOUNTS FOR MEMBERS IN A SOCIAL NETWORK

(75) Inventor: Sitaram Iyer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1195 days.

(21) Appl. No.: 10/880,707

(22) Filed: Jun. 30, 2004

(51) Int. Cl.
*H04L 9/32* (2006.01)

(52) U.S. Cl.
USPC .......................................................... 713/169

(58) Field of Classification Search
USPC .......................................................... 713/169
See application file for complete search history.

(56) References Cited

U.S. PATENT DOCUMENTS

| | | | |
|---|---|---|---|
| 5,796,393 A | 8/1998 | MacNaughton et al. | |
| 6,029,150 A * | 2/2000 | Kravitz | 705/39 |
| 6,041,311 A | 3/2000 | Chislenko et al. | |
| 6,073,138 A | 6/2000 | de l'Etraz et al. | |
| 6,092,049 A | 7/2000 | Chislenko et al. | |
| 6,130,938 A | 10/2000 | Erb | |
| 6,192,119 B1 | 2/2001 | Wilson | |
| 6,256,648 B1 | 7/2001 | Hill | |
| 6,285,999 B1 | 9/2001 | Page | |
| 6,389,372 B1 | 5/2002 | Glance | |
| 6,421,678 B2 | 7/2002 | Smiga et al. | |
| 6,442,567 B1 | 8/2002 | Retallick et al. | |
| 6,594,673 B1 | 7/2003 | Smith | |
| 6,658,423 B1 | 12/2003 | Pugh et al. | |
| 6,697,478 B1 | 2/2004 | Meldrum et al. | |
| 6,754,322 B1 | 6/2004 | Bushnell | |
| 6,799,176 B1 | 9/2004 | Page | |
| 6,895,406 B2 | 5/2005 | Fables et al. | |
| 6,912,505 B2 | 6/2005 | Linden et al. | |
| 6,957,199 B1 * | 10/2005 | Fisher | 705/78 |
| 7,000,832 B2 * | 2/2006 | Washington et al. | 235/380 |
| 7,069,308 B2 | 6/2006 | Abrams | |
| 7,080,117 B2 | 7/2006 | De Pinto et al. | |

(Continued)

FOREIGN PATENT DOCUMENTS

| | | |
|---|---|---|
| CN | 1949220 A | 4/2007 |
| JP | 11265369 A | 9/1999 |

(Continued)

OTHER PUBLICATIONS

Sitaram Iyer, Web Site, "Accounts Website," http://www.cs.rice.edu/~ssiyer/accounts/, printed Jul. 29, 2004.

(Continued)

*Primary Examiner* — Teshome Hailu
(74) *Attorney, Agent, or Firm* — Patent Law Works LLP

(57) ABSTRACT

Embodiments of the present invention comprise systems and methods of creating monetary accounts for members in a social network. One aspect of one embodiment of the present invention comprises receiving transaction data associated with at least one member of a social network, associating a first member of the social network with a trust factor, associating a second member of the social network with another trust factor, and determining whether to create an account between the first member and second member, based at least in part on the trust factor of the first member and the trust factor of the second member. Another aspect of one embodiment of the present invention comprises receiving transaction data from a plurality of members of a social network, wherein each member has an associated trust factor, and resolving the transaction data based at least in part on the trust factors associated with the plurality of members.

61 Claims, 4 Drawing Sheets

(56) References Cited

U.S. PATENT DOCUMENTS

| | | | |
|---|---|---|---|
| 7,092,821 B2 | 8/2006 | Mizrahi et al. | |
| 7,106,848 B1 | 9/2006 | Barlow et al. | |
| 7,113,917 B2 | 9/2006 | Jacobi et al. | |
| 7,117,254 B2 | 10/2006 | Lunt et al. | |
| 7,118,153 B2 | 10/2006 | Kitayama et al. | |
| 7,139,252 B2 | 11/2006 | Babu et al. | |
| 7,155,608 B1 | 12/2006 | Malik et al. | |
| 7,246,164 B2 | 7/2007 | Lehmann | |
| 7,269,590 B2* | 9/2007 | Hull et al. | 707/770 |
| 7,275,068 B2 | 9/2007 | Huberman et al. | |
| 7,343,335 B1* | 3/2008 | Olliphant | 705/26 |
| 7,366,990 B2 | 4/2008 | Pitroda | |
| 7,433,832 B1 | 10/2008 | Bezos et al. | |
| 7,478,078 B2 | 1/2009 | Lunt | |
| 7,539,697 B1 | 5/2009 | Akella et al. | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2002/0059130 A1* | 5/2002 | Cheng et al. | 705/37 |
| 2002/0059201 A1 | 5/2002 | Work | |
| 2002/0103682 A1 | 8/2002 | Stemmer | |
| 2002/0116466 A1 | 8/2002 | Trevithick | |
| 2002/0124053 A1 | 9/2002 | Adams | |
| 2002/0137490 A1 | 9/2002 | Gallant | |
| 2002/0143874 A1 | 10/2002 | Marquette et al. | |
| 2002/0143944 A1 | 10/2002 | Traversat | |
| 2003/0018554 A1* | 1/2003 | Lyftogt et al. | 705/35 |
| 2003/0020977 A1 | 1/2003 | Smith et al. | |
| 2003/0050977 A1 | 3/2003 | Puthenkulam | |
| 2003/0063072 A1 | 4/2003 | Brandenberg | |
| 2003/0078884 A1* | 4/2003 | Bauman | 705/39 |
| 2003/0083898 A1 | 5/2003 | Wick | |
| 2003/0126074 A1* | 7/2003 | Klatt et al. | 705/39 |
| 2003/0163530 A1 | 8/2003 | Ribak | |
| 2003/0216996 A1* | 11/2003 | Cummings et al. | 705/39 |
| 2004/0041836 A1 | 3/2004 | Zaner | |
| 2004/0042599 A1 | 3/2004 | Zaner | |
| 2004/0088325 A1 | 5/2004 | Elder | |
| 2004/0122681 A1 | 6/2004 | Ruvolo et al. | |
| 2004/0122803 A1 | 6/2004 | Dom | |
| 2004/0148275 A1* | 7/2004 | Achlioptas | 707/3 |
| 2004/0162830 A1 | 8/2004 | Shirwadkar | |
| 2004/0167794 A1 | 8/2004 | Shostack | |
| 2004/0193684 A1 | 9/2004 | Ben Yoseph | |
| 2004/0215793 A1 | 10/2004 | Ryan et al. | |
| 2004/0221309 A1 | 11/2004 | Zaner et al. | |
| 2004/0225509 A1* | 11/2004 | Andre | 705/1 |
| 2004/0249811 A1 | 12/2004 | Shostack et al. | |
| 2004/0258220 A1 | 12/2004 | Levine et al. | |
| 2004/0260781 A1 | 12/2004 | Shostack et al. | |
| 2005/0021750 A1* | 1/2005 | Abrams | 709/225 |
| 2005/0050158 A1 | 3/2005 | Solari | |
| 2005/0071741 A1 | 3/2005 | Acharya et al. | |
| 2005/0102242 A1* | 5/2005 | Omidyar | 705/65 |
| 2005/0152521 A1 | 7/2005 | Liljestrand | |
| 2005/0159998 A1* | 7/2005 | Buyukkokten et al. | 705/11 |
| 2005/0165785 A1 | 7/2005 | Malkin et al. | |
| 2005/0192958 A1* | 9/2005 | Widjojo et al. | 707/5 |
| 2005/0197846 A1* | 9/2005 | Pezaris et al. | 705/1 |
| 2005/0198031 A1 | 9/2005 | Pezaris et al. | |
| 2005/0210409 A1 | 9/2005 | Jou | |
| 2005/0267766 A1 | 12/2005 | Galbreath et al. | |
| 2006/0026288 A1 | 2/2006 | Acharya et al. | |
| 2006/0077957 A1 | 4/2006 | Reddy et al. | |
| 2006/0085259 A1* | 4/2006 | Nicholas et al. | 705/14 |
| 2006/0085370 A1* | 4/2006 | Groat et al. | 707/1 |
| 2006/0136419 A1* | 6/2006 | Brydon et al. | 707/9 |
| 2006/0184997 A1* | 8/2006 | La Rotonda et al. | 726/2 |
| 2006/0206604 A1 | 9/2006 | O'Neil et al. | |
| 2006/0215793 A1* | 9/2006 | Li et al. | 375/345 |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0133716 A1 | 6/2008 | Rao et al. | |
| 2008/0192656 A1 | 8/2008 | Vagelos | |
| 2009/0013386 A1 | 1/2009 | Puthenkulam | |
| 2009/0327128 A1* | 12/2009 | Olliphant | 705/40 |
| 2011/0098156 A1 | 4/2011 | Ng et al. | |

FOREIGN PATENT DOCUMENTS

| | | |
|---|---|---|
| JP | 2002132604 A | 10/2002 |
| WO | WO 00/68860 | 11/2000 |
| WO | WO02079984 | 10/2002 |

OTHER PUBLICATIONS

Web Site, "About Multiply," http://multiply.com/info/about, printed May 3, 2004.

Web Site, "Help," http://multiply.com/info/help, printed May 3, 2004.

Web Site, "Is Friendster the 'Next Big Thing'?" http://mobilemomentum.msn.com/article.aspx?aid=4, printed Mar. 25, 2004.

Web Site, "Multiply Privacy Policy," http://multiply.com/info/privacy, printed May 3, 2004.

Web Site, "Multiply Terms of Service," http://multiply.com/info/tos, printed May 3, 2004.

Web Site, "Running Notes From Revenge of the User: Lessons from Creator/User Battles," http://craphound.com/danahetcon04.txt, printed Jul. 28, 2004.

Web Site, "Is It Really Personalized Search?" Search Engine Watch.com, printed May 13, 2004.

Jay Menna, "Phone Valet: Integrate your Phone with Mac OS X,O'Grady's PowerPage," http://www.powerpage.org/cgi-bin/WebObjects/powerpage.woa/wa/story?newsID=11803, Feb. 17, 2004.

Adamic, Lada et al., Web Site, "A Social Network Caught in the Web," http://firstmonday.org/issues/issue8_6/adamic/, printed Jul. 28, 2004.

Web Site, "WestClip", printed Jul. 28, 2004.

Rick Munarriz, LifeMinders.com Markets a Double, Mar. 9, 2000.

Web Site, "ebay–What is eBay" http://pages.ebay.com/help/welcome/about-ebay.html, printed Jul. 29, 2004.

Web Site, "Listings—Tribe.net" www.tribe.net/tribe/servlet/template/pub,Listings.vm, printed Jun. 28, 2004.

Web Site, "Using AIM on Windows", http://www.aim.com/help_faq/using/win/away.adp?aolp=, (the updated date for this site is Jun. 7, 2007).

Google, Inc., "Google Answers," Google, 2004, 1 page, [online] [retrieved on Jul. 29, 2004] retrieved from the internet <URL:http://answers.google.com/answers/>.

Google, Inc., "Google Answers: Frequently Asked Questions," Google, 2003, 9 pages, [online] [retrieved on Jul. 29, 2004] retrieved from the internet <URL:http://answers.google.com/answers/faq.html>.

Yahoo! Inc., "Yahoo! Groups," Yahoo! Inc., 2004, 2 pages, [online] [retrieved on Jul. 29, 2004] retrieved from the internet <URL:http://groups.yahoo.com>.

Yahoo! Inc., "Yahoo! Help—Groups," Yahoo! Inc., 2004, 12 pages, [online] [retrieved on Jul. 29, 2004] retrieved from the internet <URL:http://help.yahoo.com/help/us/groups/groups-01.html>.

Yahoo! Inc., "Yahoo! Help—Groups Database," Yahoo! Inc., 2004, 9 pages, [online] [retrieved on Jul. 29, 2004] retrieved from the internet <URL:http://help.yahoo.com/help/us/groups/database>.

AT&T Personal Reach Service: Benefits and Features, Mar. 29, 2010, 7 pgs.

AT&T Personal Reach Service: Personal Reach Service, Mar. 29, 2010, 2 pgs.

International Search Report, International Application No. PCT/US2008/005118, Sep. 30, 2008, 2 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Ring Central, Inc., Internet, retrieved at http://www.ringcentral.com, Apr. 19, 2007, 1 pg.

(56) References Cited

OTHER PUBLICATIONS

Singh et al., "CINEMA: Columbia InterNet Extensible Multimedia Architecture," Department of Computer Science, Columbia University, pp. 1-83.
Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
NomadNet, "NomadNet News," web page at <URL:http://www.netnomad.com/> available via the Internet and printed Dec. 1, 2004, 12 pages.
Ofoto, "Ofoto Share Albums," web page at <URL:http://www.ofoto.com/ShareOverview.jsp?UV=363085663086_78428514107> as available via the Internet and printed Dec. 1, 2004, 2 pages.
Online Business Network, "Social Networking Site Guide-Ryze," web page at <URL:http://www.onlinebusinessnetworks.comlonline-social-networks-guide/ryze>, as available via the Internet and printed Dec. 1, 2004, 8 pages.
PC World, "PCWorld-ICQ Builds a Social Network," web page at <URL:http://www.pcworld.com/news/articleIO.aid.115084.OO.asp>, as available via the Internet and printed Dec. 1, 2004, 5 pages.
Petersen's Photographic, "My Photos at Photographic," web page at <URL:http://myphotos.photographic.com/>, as available via the Internet and printed Dec. 1, 2004, 19 pages.
PictureDot, "CactusVision WebCam from PictureDot.com-Broadcast your live webcam now, FREE!" web page at <URL:http://www.picturedot.com?CactusVision_WebCam_Info.asp>, as available via the Internetand printed Dec. 1, 2004, 2 pages.
SAE International, "Why should I register to use the SAE website?" web page at <URL:http:my.sae.org/whyregister.htm>, as available via the Internet and printed Dec. 1, 2004, 1 page.
Theme your Desktop, "Free Webcam Thumbnails on your Desktop—ANY webcam.com," web page At <URL:http://themes.anywebcam.comJdesktop/desktop.html> as available via the Internet and printed Dec. 1, 2004, 3 pages.
Yahoo!, "Introducing RSS Headlines," web page at <URL:http://e.my.yahoo.com/config/promo content?.module=ycontent>, as available via the Internet and printed Jun. 18, 2004, 1 page.
Yahoo!, "Yahoo! Chat," web page at <URL:http://chat.yahoo.com/>, as available via the Internet and printed Dec. 1, 2004, 1 page.
Yahoo!, "Yahoo! Help-Yahoo! GeoCities Tour," web page at <URL:http://help.yahoo.com/help/us/geo/tour/tour-01.html>, as available via the Internet and printed Dec. 1, 2004, 20 pages.
Yahoo! Groups, "Customize LostDrive-ln," web page at <URL:http://groups.yahoo.com/groups/lostdrive-in/confwiz>, as available via the Internet and printed Jun. 2, 2004, 10 pages.
"PlanetAll," From Internet Archive Wayback Machine, Nov. 1997, 19 pages, [online] [Retrieved on Mar. 17, 2004] Retrieved from the internet <URL: Internet Archive Wayback Machine: www.archive.org/www/planetall.com>.
Amazon.com, "Feedback FAQ," 3 pages, [online] [Retrieved on Jul. 29, 2004] Retrieved from the internet <URL:http://pages.amazon.com/execlobidos/tg/browse/-/1161284/qid=1 09111 0289/sr=1-1/002-2>.
Amazon.com, "How to Get a Great Feedback Score," 3 pages, [online] [Retrieved on Jul. 29, 2004] Retrieved from the internet <URL:http://pages.amazon.com/execlobidos/tg/browse/-/131074 71/qid=1091110289/sr=1-5/002>.
Amazon.com, "New Seller FAQ," 3 pages, [online] [Retrieved on Jul. 29, 2004] Retrieved from the internet <URL:http://pages.amazon.com/execlobidos/tg/browse/-/1161274/002-2835726-5513622>.
Amazon.com, "Selling at Amazon Marketplace," 2 pages, [online] [Retrieved on Jul. 29, 2004] Retrieved from the internet <URL:http://pages.amazon.com/exedobidos/tg/browse/-/1161234/ref=hp_hp_ls_4_2/002-283572>.
Amazon.com, "Amazon.com Friends and Favorites," 6 pages, [online] [Retrieved on Feb. 27, 2004] Retrieved from the internet <URL:http://www.amazon.com/exec/obidos/subst/community/community-home.html/ref=pd_ys_ . . . >.
Amazon.com. "Purchase Circles," 2 pages, [online] [Retrieved on Feb. 27, 2004] Retrieved from the internet <URL:http://www.amazon.com/exec/obidos/tg/browse/468604/ref=cm_pc_faq/002-0759267-82 . . . >.
Amazon.com, "Wish Lists," 4 pages, [online] [Retrieved on Feb. 18, 2004] Retrieved from the internet <URL:http://www.amazon.com/exec/obidos/tg/browse/-/897204/ref=ya_hp_reg_1/002-9880811- . . . >.
Avery, C., et al., "Recommender Systems for Evaluating Computer Messages," Communications of the ACM, Mar. 1997, pp. 88-89, vol. 40, No. 3.
Ebay.com, "Frequently Asked Questions," 4 pages, [online] [Retrieved on Jul. 29, 2004] Retrieved from the internet <URL:http://pages.ebay.com/help/basics/faq.html as available via the internet and printed on Jul. 29, 2004>.
Ebay.com, "How to Bid," 2 pages, [online] [Retrieved on Jul. 29, 2004] Retrieved from the internet <URL:http://pages.ebay.com/help/welcome/bid.html>.
Ebay.com, "How to Sell," 2 pages, [online] [Retrieved on Jul. 29, 2004] Retrieved from the internet <URL:http://pages.ebay.com/help/welcome/sell.html.
Ebay.com, "Star," 2 pages, [online] [Retrieved on Jul. 1, 2008] Retrieved from the internet <URL:http://pages.ebay.com/help/basics/g-stars.html>.
Konstan, J., et al., "Applying Collaborative Filinger to Usenet News," Communications of the ACM, Mar. 1997, pp. 77-87, vol. 40, No. 3.
Kamvar, S., et al., "The EigenTrust Algorithm for Reputation Management in P2P Networks." International World Wide Web Conference Proceedings of the 12th Proceedings of the 12th ICWWW 2003, pp. 640-651.
PCT International Search Report and Written Opinion, PCT/US2005/002240, Sep. 26, 2006, 5 Pages.
PCT International Search Report and Written Opinion, PCT/US2005/001544, Apr. 29, 2005, 9 Pages.
European Examination Report for European Patent Application EP 05722454.5, Feb. 8, 2007, 5 Pages.
Adamic, L., et al., "A social network caught in the Web", First Monday, 2003, pp. 1-22.
Agarwal, P et al., "Enabling Real-Time User Interests for Next Generation Activity-Oriented Social Networks", A Thesis submitted to the Indian Institute of Technology Delhi in conformity with the requirements for the degree of Bachelor of Technology, 2005, 70 pages.
Anwar, Z., et al., "Leveraging 'Social-Network' Infrastructure to Improve Peer-to-Peer Overlay Performance: Results from Orkut", 2005, 9 pages.
Baird, D., et al., "Neomillennial user experience design strategies: utilizing social networking media to support "Always on" Learning Styles," J. Educational Technology Systems, vol. 34(1) 5-32, 2005-2006.
Boyd, D., et al., "Social Network Sites: Definition, History, and Scholarship", Journal of Computer-Mediated Communication 13 (2008) 210-230.
Churchill, E., et al., "Social Networks and Social Networking", IEEE Internet Computing, Published by the IEEE Computer Society, Sep. Oct. 2005, pp. 14-19.
Cohen, T., et al., "Social Networks for Creative Collaboration", C&C'05, Apr. 12-15, 2005, ACM, pp. 252-255.
Decker, S., et al., "The Social Semantic Desktop", DERI Technical Report May 2, 2004, 7 pages.
Eagle, N., et al., "Social Serendipity: Proximity Sensing and Cueing", MIT Media Laboratory Technical Note 580, May 2004, 18 pages.
Erickson, T., et al., "Social Translucence: Using Minimalist Visualizations of Social Activity to Support Collective Interaction", In Designing Information Spaces: The Social Navigation Approach (eds. K. Höök, Benyon, A Munroe), Springer-Verlag: London, 2003, pp. 17-41.

(56) References Cited

OTHER PUBLICATIONS

Gross, R., et al., "Information Revelation and Privacy in Online Social Networks", WPES'05, Nov. 7, 2005, ACM, pp. 71-80.

Hammond, T., et al., "Social Bookmarking Tools (I)", D-Lib Magazine, Apr. 2005, 23 pages, vol. 11, No. 4.

Heer, J., et al., "Vizster: Visualizing Online Social Networks", IEEE Symposium on Information Visualization, 2005, 8 pages.

Leonard, A., "You are who you know", published on www.salon.com, Jun. 15, 2004, 15 pages.

Lockheed-Martin Corporation "Battlefield awareness and data dissemination intelligent information dissemination server," AFRL-IF-RS-TR-1999-238, Final Technical Report, Nov. 1999, 31 pages.

Marwick, A.E., "Selling Your Self: Online Identity in the Age of a Commodified Internet", A thesis submitted in partial fulfillment of the requirements for the degree of Master of Arts University of Washington, 2005, 192 pages.

Metcalf, S., et al., "Spatial Dynamics of Social Network Evolution", Presented at the 23rd International Conference of the System Dynamics Society, Jul. 19, 2005, 13 pages.

Mori, J., et al., "Real-world Oriented Information Sharing Using Social Networks", GROUP'05, Nov. 6-9, 2005, ACM, pp. 81-84.

Nardi, B., et al., "Blogging as Social Activity, or, Would You Let 900 Million People Read Your Diary?" CSCW, Nov. 6-10, 2004, ACM, pp. 222-231, vol. 6, Issue 3.

Neumann, M., et al., "Semantic social network portal for collaborative online communities", Journal of European Industrial Training, vol. 29 No. 6, 2005 pp. 472-487.

O'Murchu, I., et al., "Online Social and Business Networking Communities", DERI—Digital Enterprise Research Institute, DERI Technical Report Aug. 11, 2004, 22 pages.

Steen, M., et al., "Development of web-centric, context-aware, adaptive mobile services requires empathy and dialogue", Freeband FRUX, 2005, pp. 1-4.

Van Eijk, R., et al., "We-centric, context-aware, adaptive mobile service bundles", Telematica Instituut, Nov. 30, 2004, 48 pages, published on Freeband.

Wenger, E., et al., "Technology for communities", CEFRIO Book Chapter v 5.2, Jan. 18, 2005, pp. 1-15.

Livejournal syndicated accounts (2004), last updated Jan. 6, 2004, can be retrieved at <URL:http://www.livejournal.com/syn/>, 2 pages.

\* cited by examiner

METHODS AND SYSTEMS FOR CREATING MONETARY ACCOUNTS FOR MEMBERS IN A SOCIAL NETWORK

FIELD OF THE INVENTION

The invention generally relates to social networks. More particularly, the invention relates to methods and systems for creating monetary accounts for members in a social network.

BACKGROUND

Conventional websites such as those hosted on Friendster™, Yahoo!™, Tribe™, Tickle™, or other web sites, facilitate interaction between members of a network or group. These conventional websites generally do not allow members to create, maintain, or share accounts involving money payments to or from other members.

Some conventional websites provide the ability to create and maintain an account involving money payments to or from other users of the website. For example, one website, such as www.cs.rice.edu/~ssiyer/accounts, allows users to make payment entries. The website determines which users are owed money by calculating amounts owed to other users from the payment entries. In some instances, a first user could be notified of a "proxy payment" made by another user (a proxy) to satisfy an amount owed by or owed to the first user from yet another user. However, anyone could join this website and there was no level of trust between users.

SUMMARY

Embodiments of the present invention comprise systems and methods for creating monetary accounts for members in a social network. One aspect of one embodiment of the present invention comprises receiving transaction data associated with at least one member of a social network, associating a first member of the social network with a trust factor, associating a second member of the social network with another trust factor, and determining whether to create an account between the first member and second member, based at least in part on the trust factor of the first member and the trust factor of the second member.

Another aspect of one embodiment of the present invention comprises receiving transaction data from a plurality of members of a social network, wherein each member has an associated trust factor, and resolving the transaction data based at least in part on the trust factors associated with the plurality of members. Further features and advantages of the present invention are set forth below.

DETAILED DESCRIPTION

Overview

The present invention comprises methods and systems for creating monetary accounts for members in a social network.

In one embodiment, an exemplary method for creating monetary accounts for members in a social network includes receiving transaction data from a plurality of members of a social network, wherein each member has an associated trust factor. The method also includes resolving the transaction data based at least in part on the trust factors associated with the plurality of members.

System Environment and Architecture

Figure 1:
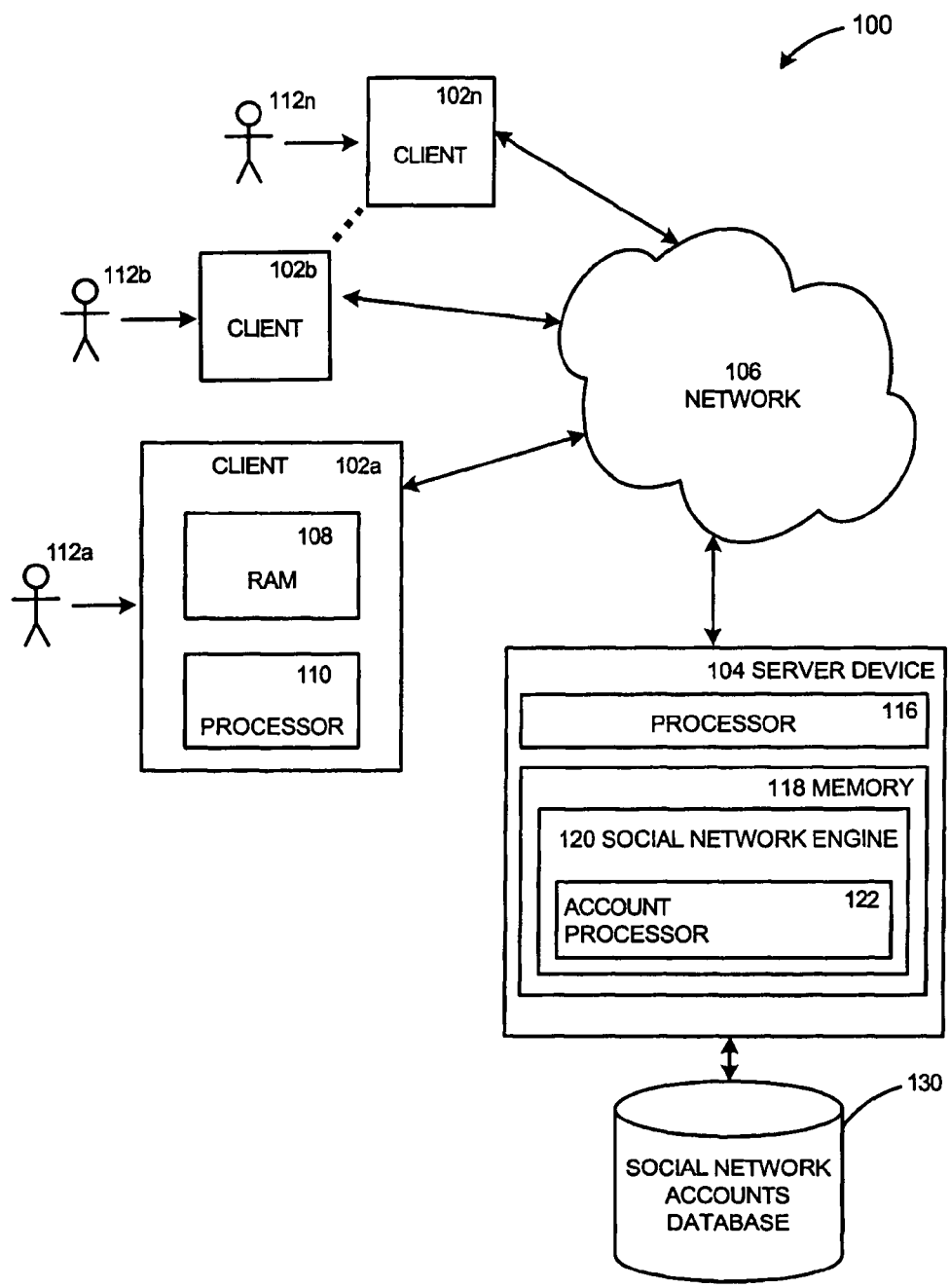
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106. The server device 104 shown comprises a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains a social network engine application program, also known as a social network engine 120. The social network engine 120 facilitates members, such as user 112a, interacting with and participating in a social network. A social network can comprise profiles that can be associated with other profiles. Each profile may represent a member and a member can be, for example, a person, an organization, a business, a corporation, a community, a fictitious person, or other entity. Each profile can contain entries, and each entry can comprise information associated with a profile. Examples of entries for a person profile can comprise information regarding relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines, email addresses, location information, IM name, phone number, address, skills, career, or any other information describing, identifying, or otherwise associated with a profile. Entries for a business profile can comprise market sector, customer base, location, supplier information, net profits, net worth, number of employees, stock performance, or other types of information associated with the business profile. Additionally, entries within a profile can comprise associations with other profiles. Associations between profiles within a social networks can include, for example, friendships, business relationships, acquaintances, community associations, activity partner associations, common interest associations, common characteristic associations, or any other suitable type of association between profiles.

The social network engine 120 can comprise an account processor 122. The account processor 122 can facilitate the ability of the users 112a-n to enter transaction data such as payment entries. The account processor 122 can resolve the transaction data based in part on trust factors such as trust values associated with the users 112a-n, and can store resolutions of transaction data in an account associated with each user 112a-n. The account processor 122 can cause the display on the client device 102a of an account interface associated with an account. The account interface can display account information of the users 112a-n, can further display the resolution of transaction data from the users 112a-n, and can allow users 112a-n to make a payment associated with the resolution of transaction data from the users 112a-n to another member. A member's account can be contained in and displayed with the member's profile.

Account information can include, but is not limited to, member name, a community name, an address, an e-mail address, a telephone number, contact information, payment entries, resolution of payment entries, owing entries, payment data, a proxy payment, proxy payment data, currency amounts paid to other users, currency amounts owed to other users, unit amounts traded with others, unit amounts owed to others, data associated with a user's transaction with an account of another user, data associated with another community's transaction with an account of another community.

Server device 104 also provides access to storage elements, such as a social network storage element, in the example shown in FIG. 1, a social network account database 130. The social network account database 130 can be used to store transaction data, resolved transaction data, accounts, associated account information, and profiles. Data storage elements may include any one or combination of methods for storing data, including without limitation, arrays, hash tables, lists, and pairs. Other similar types of data storage devices can be accessed by the server device 104. The social network engine 120 can receive a profile comprising information associated with a member and can send information associated with a member to the social network account database 130 for storage. The social network account database 130 may be physically attached or otherwise in communication with the social network engine 120 by way of a network or other connection.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the social networks and methods illustrated in FIGS. 2-4.

Exemplary Social Network

Figure 2:
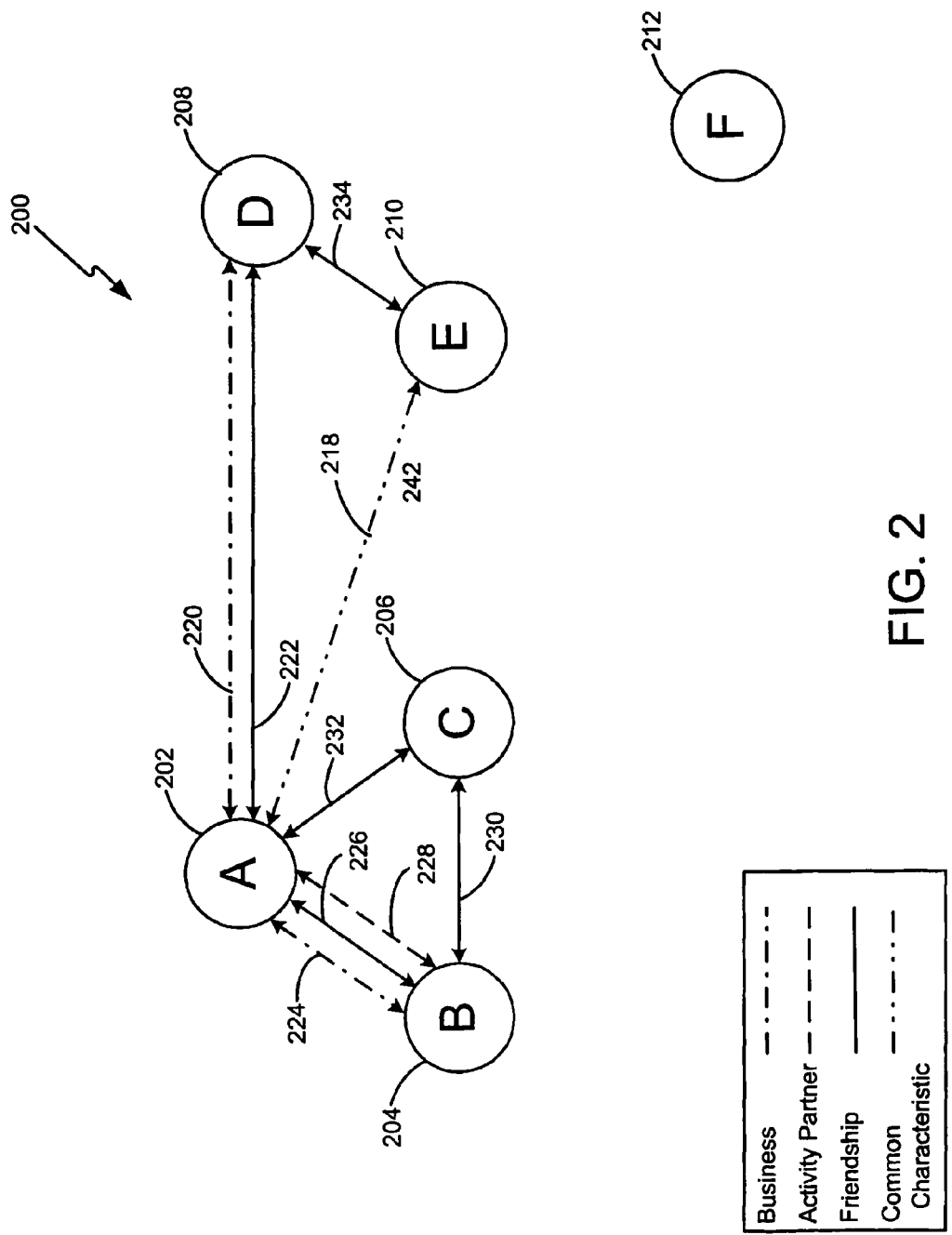
FIG. 2 illustrates one embodiment of a social network according to one embodiment of the present invention.

FIG. 2 illustrates an exemplary embodiment of a social network 200. According to the embodiment illustrated in FIG. 2, the social network 200 comprises a graph comprising vertices 202-212 and edges 218-234. The vertices 202-212 comprise profiles A-F. Each profile can represent a member. The edges 218-234 comprise associations between profiles. According to the embodiment shown in FIG. 2, the social network 200 comprises a plurality of differing types of associations represented by edges 218-234. The types of associations listed in FIG. 2 for illustration purposes are business associations, activity partner associations, friendship associations, community associations, and common characteristic associations. Common characteristic associations can include associations based on some characteristic such as attending the same high school or being from the same hometown, but can indicate a lower level of significance that another type of association, such as a friendship association. Each type of association can also have ranging levels. For example, a friendship association can have levels such as "haven't met," "acquaintance," "friend," "good friend," and "best friend."

For example, edge 220 and edge 222 each comprise an association between profile A at vertex 202 and Profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A-F comprising the vertices 202-212, for purposes of illustration is a person. Other types of members can be in social network 200. The associations 220-234 illustrated in FIG. 2 comprise bi-directional associations. The associations are bi-directional because when one profile, for example profile A, is associated with another profile, for example profile D, then profile D is also associated with profile A. In one embodiment, A and D will not be associated with each other until both profiles consent to such association; e.g., A may invite D to be associated therewith, and the association occurs upon D's acceptance of such invitation. The invitation, for example, may include sending an email or other message to D indicating that A has requested an association with D.

Other embodiments of the present invention may comprise directed associations or other types of associations. Directed associations associate a first profile with a second profile while not requiring the second profile to be associated with the first profile. For example, in a directed chart, profile A can be associated by a friendship association with profile B, and profile B can be unassociated by a friendship connection with profile A. Thus a display of profile A's friends would include profile B, but a display of profile B's friends would not include profile A.

Within a social network, a degree of separation can be determined for associated profiles. One method of determining a degree of separation is to determine the fewest number of edges of a certain type separating the associated profiles. This method of determining a degree of separation can produce a type-specific degree of separation. A type-specific degree of separation is a degree of separation determined based on one particular type of association. For example, a profile A has a friend association degree of separation of two from profile E. The fewest number of friendship associations between profile A and profile E is two—the friendship association comprising edge 220 and the friendship association comprising edge 234. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, "best" friendship associations can be weighted higher than more distant friendships, such as "haven't met." According to certain aspects of embodiments using a level or weighting factor, a higher weighting factor for an association can reduce the degree of separation between profiles and lower levels or weighting factors can increase the degree of separation. This can be accomplished, for example, by establishing an inverse relationship between each associations and a corresponding weighting factor prior to summing the associations. Thus, highly weighted associations would contribute less to the resulting sum than lower weighted associations.

According to other aspects of certain embodiments of the present invention, members can be rated by other members in predefined categories. Such ratings can be stored as part of the profiles A-F. For example, predefined categories can include "fan," "trusty," "cool," and "sexy." Trusty can indicate the trustworthiness of the member. Levels of each predefined category can exist. For example, one smiley face can indicate "trustworthy," two smiley faces can indicate "very trustworthy," and three smiley faces can indicate "super trustworthy." More categories as well as different categories are possible, such as how nice, dependable, social, responsible, or successful the member is. Fewer or greater numbers of levels of each predefined category are also possible.

Processes

Various methods in accordance with embodiments of the present invention may be carried out. One exemplary method according to the present invention comprises receiving transaction data associated with at least one member of a social network, associating a first member of the social network with a trust factor, associating a second member of the social network with another trust factor, and determining whether to create an account between the first member and second member, based at least in part on the trust factor of the first member and the trust factor of the second member.

In one aspect of the invention, the transaction data includes at least one of the following: a payment entry, an owing entry, an amount paid by one user on behalf of at least one other user, an amount paid by a group on behalf of at least one other group, and an instruction from a user regarding who the user will or will not transact with.

In another aspect of the invention, the trust factors are based on at least one of the following: a trust value, a previously stored value, a preset value, a trust rating, history of transactions with other members, number of transactions with other members, quality of transactions with other members, number of other accounts associated with a particular member, age of other accounts associated with a particular member, accessibility of a member via e-mail or other communications, location of a member, an instruction received from a member that another member is a trusted member, a type of association, strength of relationship between members, degree of separation, and an instruction from a user regarding who the user will or will not transact with, and a trust signal that includes at least one trust factor.

In another aspect of the invention, determining whether to create an account between the first member and second member, based at least in part on the trust factor of the first member and the trust factor of the second member, includes at least one of the following: comparing either trust factor to a preset value, comparing either trust factor to a threshold, comparing the trust factors to a preset value, comparing the trust factors to a threshold, comparing a trust rating associated with each member to a preset value, comparing a trust rating associated with each member to a threshold, receiving an instruction from either member that the other member is or is not a trusted member, determining that a relationship between the first member and the second member is a particular type of association, determining that a relationship between the first member and the second member is a friendship association, determining that a relationship between the first member and the second member is within a preset degree of separation, determining that either member has transacted with the other member at a prior time, a user-provided list of conditions, receiving an instruction from a member regarding who the member will or will not transact with, comparing a trust signal with a predefined value, and comparing a trust signal with a threshold.

Yet another aspect of the invention, includes receiving a payment entry from the first member, and determining an amount owed by the second member.

An additional aspect of the invention includes storing the payment entry and the amount owed in the account.

Another aspect of the invention includes outputting information associated with the account to either the first member or the second member.

In another aspect of the invention, outputting information associated with the account to either the first member or the second member, includes displaying an amount owed to a member.

In another aspect of the invention, outputting information associated with the account to either the first member or the second member, includes notifying both members of an amount owed to a member.

Another method according to the present invention comprises receiving transaction data from a plurality of members of a social network, wherein each member has an associated trust factor, and resolving the transaction data based at least in part on the trust factors associated with the plurality of members.

In one aspect of the invention, the trust factors are associated with at least one of the following: a trust value, a previously stored value, a preset value, a trust rating, history of transactions with other members, number of transactions with other members, quality of transactions with other members, an instruction received from a member that another member is a trusted member, a type of association, strength of relationship between members, degree of separation, an instruction from a user regarding who the user will or will not transact with, and a trust signal that includes at least one trust factor.

In another aspect of the invention, resolving the transaction data based at least in part on the trust factors associated with the plurality of members includes at least one of the following: comparing either trust factor to a preset value, comparing either trust factor to a threshold, comparing the trust factors to a preset value, comparing the trust factors to a threshold, comparing a trust rating associated with a member to a preset value, comparing a trust rating associated with each member to a threshold, receiving an instruction from one member that another member is or is not a trusted member, determining that a relationship between one member and another member is a particular type of association, determining that a relationship between one member and another member is a friendship association, determining that a relationship between one member and another member is within a preset degree of separation, determining that one member has transacted with another member at a prior time, a user-provided list of conditions, receiving an instruction from a member regarding who the member will or will not transact with, comparing a trust signal with a predefined value, and comparing a trust signal with a threshold.

In yet another aspect of the invention, the transaction data is associated with at least one of the following: a monetary amount, a foreign monetary amount, a currency type, a foreign currency type, an exchange rate, a unit amount, a unit type, an instruction associated to splitting an amount, a date, a time, a member name, a community name, and an, instruction from a user regarding who the user will or will not transact with.

In another aspect of the invention, resolving the transaction data based at least in part on the trust factors associated with the plurality of members, includes creating an account.

In another aspect of the invention, the account includes at least one of the following: a payment entry from at least one member, and an amount owed to a member.

In yet a further aspect of the invention, resolving the transaction data based at least in part on the trust factors associated with the plurality of members, includes determining whether a proxy payment can be made.

A further aspect of the invention includes receiving a selection from at least one member to make a proxy payment to another member of the social network.

An additional aspect of the invention includes sending a notification to a member regarding making a proxy payment to another member of the social network.

Yet a further aspect of the invention includes receiving a selection from at least one member to make a payment to another member of the social network.

Another aspect of the invention includes sending a notification to a member regarding making a payment to another member of the social network.

Another method in accordance with the present invention includes receiving transaction data from at least one member of a social network, associating a first member of the social network with a trust factor, associating a second member of the social network with another trust factor, determining whether to create an account between the first member and second member, based at least in part on the trust factor of the first member and the trust factor of the second member, receiving a payment entry from the first member, determining an amount owed by the second member, and storing the payment entry and the amount owed in the account.

Yet another method in accordance with the present invention includes receiving transaction data from a plurality of members of a social network, wherein each member has an associated trust factor, resolving the transaction data based at least in part on the trust factors associated with the plurality of members, comprising determining whether a proxy payment can be made, receiving a selection from at least one member to make a payment to another member of the social network, and sending a notification to a member regarding making a payment to another member of the social network.

Figure 3:
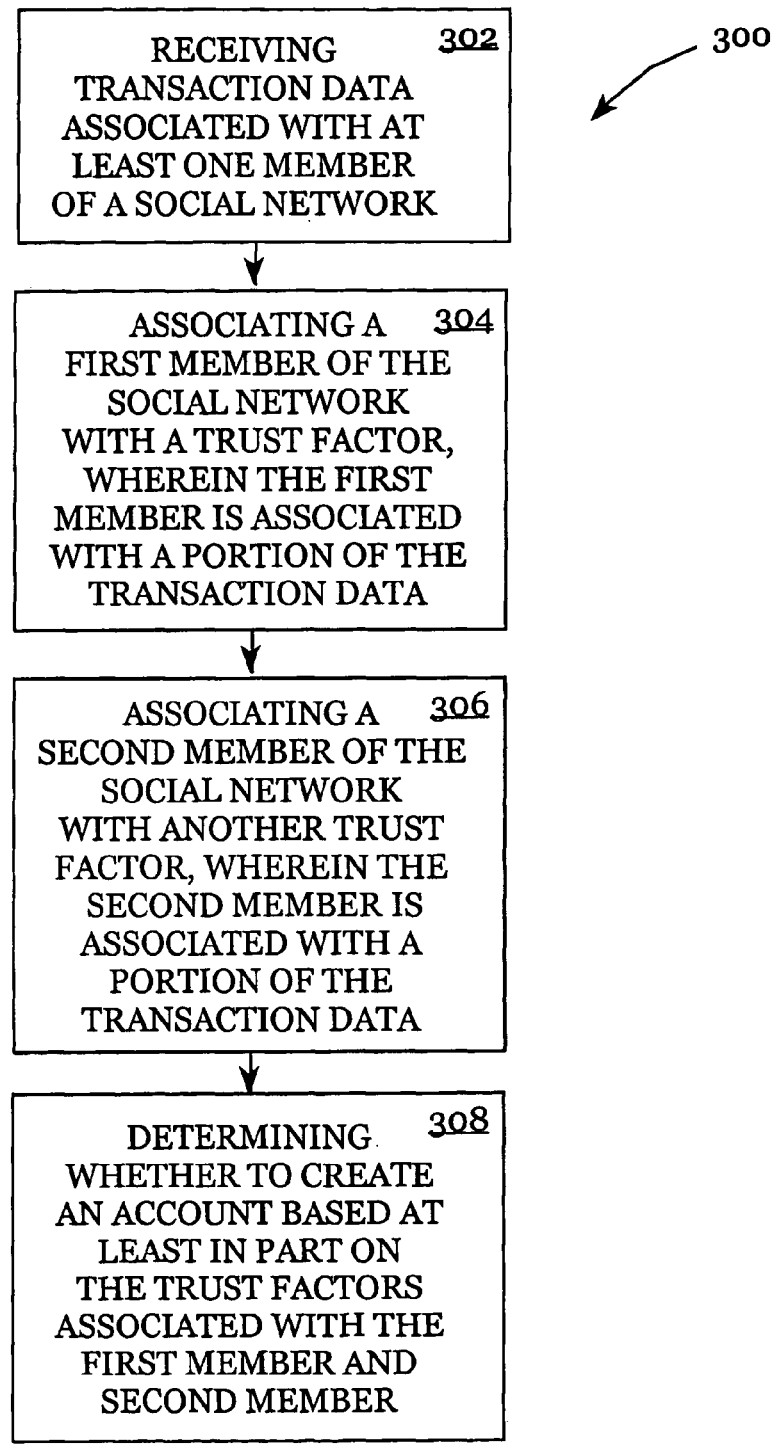
FIG. 3 illustrates a flow diagram of one embodiment of a method carried out by the present invention.

FIG. 3 illustrates an exemplary method 300 that provides a method for creating monetary accounts for members in a social network, in accordance with one embodiment of the invention. This exemplary method is provided by way of example, as there are a variety of ways to carry out methods according to the present invention. The method 300 shown in FIG. 3 can be executed or otherwise performed by one or a combination of various systems. The method 300 is described below as carried out by the system 100 shown in FIG. 1 by way of example, and various elements of the system 100 are referenced in explaining the example method of FIG. 3.

The method illustrated in FIG. 3 begins in block 302, in which transaction data is received. In the embodiment shown, the account processor 122 receives transaction data associated with a user 112a-n. For example, the account processor 122 receives transaction data such as a payment entry from user 112a, in which user 112a has paid $20.00 on behalf of another user 112b. Transaction data can include, but is not limited to, a payment entry, name of member who made a payment, a payment amount, name of member to whom the payment was made, how a payment should be divided between members (split evenly, or divided in disproportionate amounts), the date and/or time a payment was made, a due date, a monetary amount, a foreign monetary amount, a currency type, a foreign currency type, an exchange rate, a unit amount, a unit type, an instruction associated with splitting an amount, a date, a time, a member name, a community name, an instruction regarding an amount of trust between at least two members, and an instruction from a user regarding who the user will or will not transact with. The transaction data can be stored as part of a profile. Profiles can be stored in the social network account database 130.

Block 302 is followed by block 304, wherein the account processor 122 associates a first member of the social network with a trust factor, wherein the first member is associated with a portion of the transaction data. In the embodiment shown, in response to receiving transaction data associated with a user 112a-n, the account processor 122 determines a trust factor to a user 112a associated with a portion of the transaction data. The trust factor can be stored as part of a profile associated with the user 112a in the social network account database 130. In some cases, the trust factor depends on a relationship between the user 112a and another user 112b-n, or on an instruction provided by the user 112a with respect to another user such as 112b. In other instances, the trust factor is previously stored information in a profile associated with the user 112a. A trust factor can be based on, but not limited to, a trust value, a previously stored value, a preset value, a trust rating, history of transactions with other members, number of transactions with other members, quality of transactions with other members, number of other accounts associated with a particular member, age of other accounts associated with a particular member, accessibility of a member via e-mail or other communications, location of a member, an instruction received from a member that another member is a trusted member, a type of association between members, strength of relationship between members, degree of separation between members, an instruction from a member regarding who the member will or will not transact with, and a trust signal that includes some or all of the preceding types of factors. These and other types of associations, relationships, degrees of separation, ratings, and instructions are previously described above including with respect to FIG. 2.

Block 304 is followed by block 306, in which the account processor 122 associates a second member of the social network with another trust factor, wherein the second member is associated with a portion of the transaction data. In the embodiment shown, the account processor 122 determines a trust factor to a second user 112b associated with a portion of the transaction data. The trust factor can be stored as part of a profile associated with the second user 112b in the social network account database 130. In some cases, the trust factor depends on a relationship between the second user 112b and another user 112a, 112n. In other instances, the trust factor is previously stored information in a profile associated with the user 112b.

Block 306 is followed by block 308, in which the account processor 122 determines whether to create an account between the first member and second member, based at least in part on the trust factor of the first member and the trust factor of the second member. In the embodiment shown, the account processor 122 accesses the social network account database 130 to obtain trust factors stored in the respective profiles associated with the first user 112a and the second user 112b. Based at least in part on the trust factor associated with the first user 112a and on the trust factor associated with the second user 112b, the account processor 122 determines whether to create an account between the first user 112a and the second user 112b. The determination can be based on at least one of the following, including but not limited to, comparing a trust factor to a preset value or threshold, comparing trust values to a preset value or threshold, comparing a trust rating associated with each member to a preset value or threshold, receiving an instruction from either member that the other member is or is not a trusted member, determining that a relationship between the first member and the second member is a particular type of association, determining that a relationship between the first member and the second member is a friendship association, determining that a relationship between the first member and the second member is within a preset degree of separation, determining that either member has transacted with the other member at a prior time, a user-provided list of conditions, receiving an instruction from a member regarding who the member will or will not transact with, and comparing a trust signal with a predefined value or threshold. In this manner, the determination whether to create an account between a first member and a second member of a social network can be based on an amount of trust that may exist between the two members. In many instances, members may want to exchange monetary amounts or items of value through an account, and the amount of trust that exists between the members can affect whether an account can be utilized to facilitate the exchange.

In another embodiment, an account can be created for more than two users. For example, an account such as a "Florida Trip Account" can exist for three members that have taken or will take a trip to Florida together. Initially, transaction data is received for at least one of the members. In this example, user 112a enters a payment entry of $20.00, in which user 112a has paid $20.00 on behalf of the other two users 112b, and 112c, and the $20.00 is to be split between users 112b, and 112c. Each of three users 112a, 112b, and 112c is associated with a respective trust factor. If all of the users 112*a*, 112*b*, and 112*c* are friends, then the social network engine 120 can determine that a friendship association exists between users 112*a* and 112*b*, and between users 112*a* and 112*c*. Corresponding trust factors can be determined or otherwise assigned to users 112*a*, 112*b*, and 112*c* for each friendship association. A determination can then be made to create an single account for the three users 112*a*, 112*b*, 112*c* based at least in part on the respective trust factors of the users 112*a*, 112*b*, 112*c*. Fewer or greater numbers of members or users 112*a-n* can be associated with a single account.

When accounts can be created for more than two members, in some instances a "proxy" can be determined. For example, if user 112*a* and user 112*b* meet and can transact with each other relatively easily, and user 112*b* and user 112*c* can also meet and transact with each other relatively easily, but user 112*a* and user 112*c* cannot meet or transact with each other easily, then user 112*b* can be determined to be a "proxy" if user 112*a* finds it convenient to make a payment to user 112*c* through user 112*b*. Multiple proxies can be determined depending on the number of users, payments, amounts owed, and trust factors associated with the users.

In another embodiment, the account processor 122 can resolve a set of payment entries between multiple users 112*a-n* that minimizes the number of accounts between the users 112*a-n*. For example, based on trust factors for eight users 112*a*, 112*b*, 112*c*, 112*d*, 112*e*, 112*f*, and 112*g*, the account processor 122 can determine a number of accounts and proxies between users 112*a*, 112*b*, 112*c*, 112*d*, 112*e*, 112*f*, 112*g*, and 112*h* to resolve the payment entries in a relatively efficient manner. In this example, eight users (n=8) 112*a*, 112*b*, 112*c*, 112*d*, 112*e*, 112*f*, 112*g*, and 112*h* could make 28 different payments between each other, where the total number of payments possible is "n*(n−1)/2." The account processor 122 can determine proxies and accounts between users to resolve all 28 different payments with a preset number of payments, such as "n−1" or 7 payments. In this example, the account processor 122 can determine the payments between the users 112*a-n* to resolve all 28 different payments so that each user 112*a*, 112*b*, 112*c*, 112*d*, 112*e*, 112*f*, 112*g*, and 112*h* either receives a payment or makes a payment. In this manner, the account processor 122 can resolve payment entries in a relatively efficient manner to minimize the total number of transactions between the users 112*a*, 112*b*, 112*c*, 112*d*, 112*e*, 112*f*, 112*g*, and 112*h*. In other embodiments, other numbers of payments can be determined by the account processor 122 to minimize the possibility of one user 112*a* having to make payments to all seven of the other users 112*b*, 112*c*, 112*d*, 112*e*, 112*f*, 112*g*, and 112*h*, or the possibility of seven users 112*b*, 112*c*, 112*d*, 112*e*, 112*f*, 112*g*, and 112*h* having to make payments to one user 112*a*.

In yet another embodiment, an account can be created between communities of users. For example, an account can exist between communities of users, such as the "Legal Team" and the "Engineers." Initially, each of the communities is associated with a respective trust factor. A determination is then made to create an single account for the "Legal Team" community and the "Engineers" community based at least in part on the respective trust factors of the "Legal Team" community and the "Engineers" community. Greater numbers of communities can be associated with a single account.

In other embodiments, an account can be created between a user and a community, or any other combination of entities in a social network. Entities can include, but are not limited to, a user, a community, a business, a group, or any other entity represented by a profile in a social network.

In any instance, when an account is created, the account processor 122 can store the account in the social network account database 130. The account can include information such as transaction data, payment entries, owing entries, proxy payments, dates or times of payment entries, dates or times of owing entries, history of owings, history of payments, an e-mail address, user contact information, other information associated with a profile associated with a user 112*a-n*, names associated with the account, community names, and other information associated with members' respective profiles or communities' respective profiles. Other information can be associated and stored with an account as described below in FIG. 4.

In other embodiments, a user 112*a* may become inaccessible or desire to close a particular account with another user 112*b*. For example, the account processor 122 can receive instructions from the user 112*a* to close an account with another user 112*b*. Amounts owed from user 112*b* to user 112*a*, or vice-versa, can be escrowed with a third-party escrow entity that can facilitate monetary exchanges between user 112*a* and user 112*b* to settle any amounts owed between the users 112*a*, 112*b*. By way of another example, an account processor 122 can be notified that a particular user 112*a* is suspected of or is actually creating an account for fraudulent activity. The account processor 122 can notify a third-party escrow entity to facilitate monetary exchanges for the user 112*a* in order to safeguard transactions of other users 112*b-n* with user 112*a*. Such notifications can also be performed when a determination is made whether to create an account between the first member and second member as described above in block 308.

Figure 4:
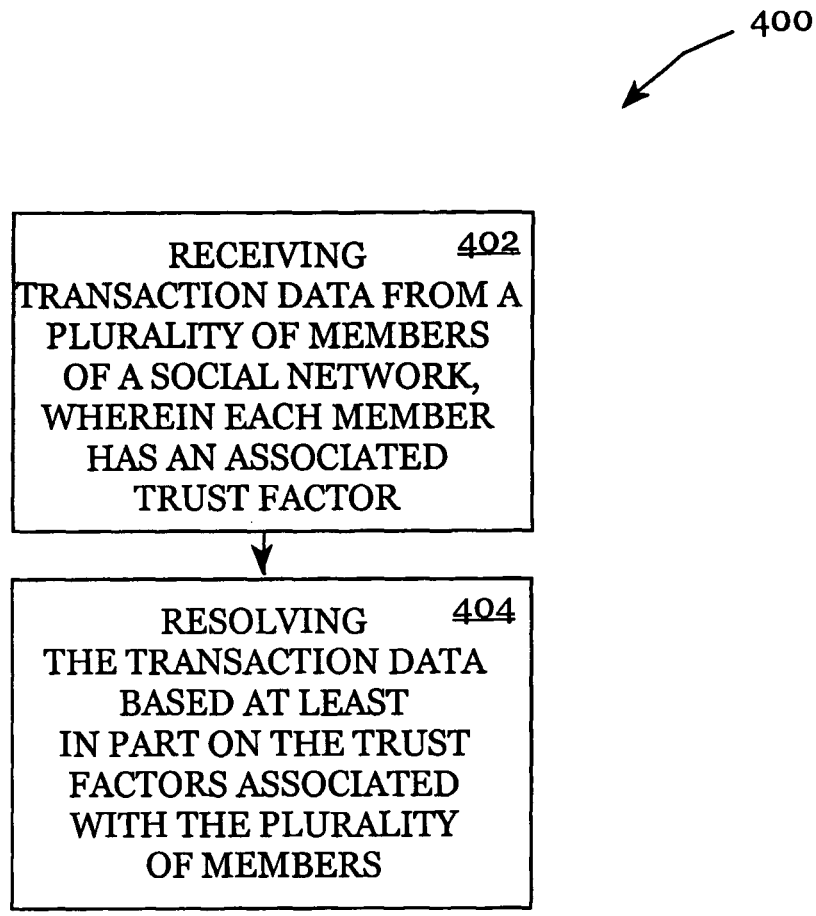
FIG. 4 illustrates a flow diagram of one embodiment of a method carried out by the present invention.

FIG. 4 illustrates an exemplary method 400 that provides a method for resolving transaction data for members in a social network, in accordance with one embodiment of the invention. This exemplary method is provided by way of example, as there are a variety of ways to carry out methods according to the present invention. The method 400 shown in FIG. 4 can be executed or otherwise performed by one or a combination of various systems. The method 400 is described below as carried out by the system 100 shown in FIG. 1 by way of example, and various elements of the system 100 are referenced in explaining the example method of FIG. 4.

The method 400 illustrated in FIG. 4 begins in block 402 wherein the account processor 122 receives transaction data from a plurality of members of a social network, wherein each member has an associated trust factor. In the embodiment shown, the user 112*a* enters the transaction data, or transaction data is otherwise entered on the behalf of a user 112*a* via the client 102*a* by use of a keyboard or other input device. The account processor 122 receives transaction data such as a payment entry from user 112*a* to user 112*b* in the amount of $20.00, and an instruction that user 112*a* will transact with another user such as 112*b*. The client 102*a* transmits the transaction data via the network 106 to the account processor 122. The transaction data can include, but is not limited to, a payment entry, name of member who made a payment, a payment amount, name of member to whom the payment was made, how a payment should be divided between members (split evenly, or divided in disproportionate amounts), the date and/or time a payment was made, a due date, a monetary amount, a foreign monetary amount, a currency type, a foreign currency type, an exchange rate, a unit amount, a unit type, an instruction associated with splitting an amount, a date, a time, a member name, a community name, an instruction regarding an amount of trust between at least two members, and an instruction from a user regarding who the user will or will not transact with.

In another embodiment, transaction data from a plurality of members of a social network can include payment entries from multiple users. For example, three members that have taken a trip to Florida together can have transaction data such as a first payment entry of $20.00 paid by user 112a on the behalf of users 112b, 112c to be divided evenly between the two users 112b, 112c; a second payment entry of $10.00 paid by user 112b on behalf of user 112a; and a third payment entry of $25.00 paid by user 112c on behalf of user 112b. Greater or fewer payment entries can exist, and greater or fewer users 112a-n with associated trust factors can be involved.

In any instance, each member is associated with a trust factor. For example, users 112a and 112b can have a friendship association, as described above in FIG. 2. The account processor 122 determines a corresponding trust factor for each of the users 112a, 112b based on the friendship association between the users 112a, 112b. A trust factor associated with a user 112a-n can also take into account other relationships with users or other factors as described above. Some or all trust factors for the users 112a-n are stored as part of a profile stored in the social network account database 130.

In another embodiment, as part of the transaction data, a user 112a enters an instruction via the client 102a that another user such as user 112c is a trusted member. The account processor 122 determines a corresponding trust factor for each user 112a, 112c based on the instruction entered by some or all users 112a, 112c. A trust factor associated with a user 112a-n can also take into account other instructions with users 112a-n or other factors as described above. Some or all trust factors for the users 112a, 112c are stored as part of a profile stored in the social network account database 130.

In another embodiment, members have a previously assigned trust factor. For example, a trust factor for a user 112b can be based on the user's prior transactions with other users 112a, 112c, in which the account processor 122 determines or otherwise assigns a trust factor to the user 112b in accordance with the number and quality of transactions with other users 112a, 112c. In other embodiments, members of a social network may not have a previously stored trust factor. In these instances, the account processor 122 can assign a default trust factor to the user 112c. For example, if a user 112c has had no prior transactions with any other users 112a, 112b, 112n, a trust factor of "0" can be assigned to user 112c indicating that no history of trust with any other user 112a, 112b, 112n has yet been established. In either instance, a trust factor associated with a user 112a-n can also take into account other previously assigned trust factors based on the user's prior transactions with other users 112a-n or other factors as described above.

In another embodiment, a plurality of members of a social network can have predefined trust factors. For example, members can have a predefined "trusty" rating based on scores or feedback given to a member from other members, where a relatively higher rating indicates a higher level of trust for a particular member. In this example, user 112a can have a predefined trusty rating of "1," user 112b can have a predefined trusty rating of "3," and user 112c can have a predefined trusty rating of "2." The account processor 122 determines corresponding trust factors from the predefined trust factors, in this example, user 112b has a higher trust factor than users 112a and 112c. A trust factor associated with a user 112a-n can also take into account other predefined ratings or other factors as described above. Predefined trust factors such as trusty ratings can be stored as part of a profile associated with each user 112a-c by the social network account database 130. Other predefined trust factors or ratings can exist, and other scales for predefined trust factors or ratings can exist.

In any instance, the account processor 122 determines, receives, or otherwise accesses trust factors associated with users 112a-n. In the embodiment shown, trust factors are stored as part of respective profiles in the social network account database 130. Trust factors can be based in part on factors previously described above including, but not limited to, a trust value, a previously stored value, a preset value, a trust rating, history of transactions with other members, number of transactions with other members, quality of transactions with other members, number of other accounts associated with a particular member, age of other accounts associated with a particular member, accessibility of a member via e-mail or other communications, location of a member, an instruction received from a member that another member is a trusted member, a type of association between members, strength of relationship between members, and degree of separation between members, an instruction from a user regarding who the user will or will not transact with, and a trust signal that includes some or all of the preceding types of factors.

Block 402 is followed by block 404, in which the account processor 122 resolves the transaction data based at least in part on the trust factors associated with the plurality of members. In the embodiment shown, the account processor 122 resolves transaction data such as a payment entry by determining whether a payment can be resolved between users 112a-n such as a first user 112a and a second user 112b based in part on their respective trust factors, and by further determining the amount (if any) owed to any users 112a-n. The account processor 122 stores the resolution of transaction data in an account associated with a user 112a-n, the account being stored in the social network account database 130. For example, in the example from block 402, transaction data such as a payment entry of $20.00 from user 112a to user 112b is received. Users 112a and 112b also have a friendship association, in which corresponding trust factors were stored as part of the user's respective profiles. The account processor 122 determines that the trust factors of users 112a, 112b indicate that a friendship association exists between the users 112a, 112b, such as comparing the trust factors to a predefined threshold. If sufficient trust between the users 112a, 112b exists, the processor 122 determines that a payment of $20.00 (an "owing entry") is owed by user 112b to user 112a. The owing entry is stored in an account associated with either or both of the users 112a, 112b, and stored in the social network account database 130. The owing entry can also include information such as, but not limited to, a monetary amount owed to a member, a unit amount owed to another member, members associated with an owing entry, a date, a time, and a due date.

In another example from block 402, transaction data from three members that have taken a trip to Florida together such as a first payment entry of $20.00 paid by user 112a on the behalf of users 112b, 112c to be divided evenly between the two users 112b, 112c; a second payment entry of $10.00 paid by user 112b on behalf of user 112a; and a third payment entry of $25.00 paid by user 112c on behalf of user 112b is received. Users 112a and 112b have trust factors based on a friendship association between users 112a and 112b; users 112a and 112c have trust factors based on the instruction from user 112a that user 112c is a trusted member; and user 112b has a trust factors based on prior transactions with users 112a and 112c. The account processor 122 determines that the trust factors of users 112a, 112b indicate that a friendship association exists between the users 112a, 112b, such as whether the respective trust factors meet or exceed a threshold value. If sufficient trust exists between the users 112a, 112b, the processor 122 determines that no payments ("owing entry") are owed between user 112a and user 112b. The owing entry is stored in an account associated with either or both of the users 112a, 112b, and stored in the social network account database 130. The account processor 122 also determines whether the trust factors of users 112a, 112c indicate that an instruction has been provided that user 112c is a trusted member. If sufficient trust exists between users 112a, 112c, the processor 122 determines that a payment of $10.00 (an "owing entry") is owed by user 112c to user 112a. The owing entry is stored in an account associated with either or both of the users 112a, 112c, and stored in the social network account database 130. The account processor 122 also determines whether the trust factors of users 112b, 112c indicates that user 112b has transacted with users 112a and 112c before. If sufficient trust exists between user 112b and users 112a and 112c, the processor 122 determines that a payment of $25.00 (an "owing entry") is owed by user 112b to user 112c. The owing entry is stored in an account associated with either or both of the users 112b, 112c, and stored in the social network account database 130. In this manner, the resolution of transaction data based at least in part on the trust factors associated with the plurality of members can be based on an amount of trust that may exist between the members involved.

In one embodiment, the account processor 122 compares a trust rating associated with each member to a preset value, such as a threshold "trusty" rating of "2." If the trust rating associated with a first user 112a meets or exceeds the threshold "trusty" rating of "2," then payment entries can be resolved with respect to the first user 112a. In this example, the trust rating associated with a second user 112b is also compared to a preset value such as a threshold "trusty" rating of "2." If the trust rating associated with a second user 112b meets or exceeds the threshold "trusty" rating of "2," then payment entries can be resolved with respect to the second user 112b. If both trust ratings meet or exceed the preset values for each respective user, such as threshold "trusty" ratings of "2," then the account processor 122 determines any owing entries between the first user 112a and second user 112b. In this manner, the resolution of transaction data based at least in part on the trust factors associated with the plurality of members can be based on an amount of trust that may exist between at least two members. In other embodiments, a trust factor such as a preset value can be other rating types or can be set to other values. The rating types and/or rating values can be also different between two users.

In another embodiment, the resolution of transaction data based at least in part on the trust factors associated with the plurality of members can be based on determining that a relationship between a first member and a second member is a particular type of association. For example, user 112a may only want to transact with users that have a friendship association with users 112a. The account processor 122 utilizes information associated with respective profiles for users 112a, 112b to determine if a relationship between the first user 112a and the second user 112b is a particular type of association, such as a friendship association as shown by reference to FIG. 2, in which edge 222 represents a friendship association between profile A at vertex 202 and Profile D at vertex 208. Other types of associations between members or users 112a, 112b can be utilized in accordance with the invention. In this example, since a particular type of association, such as a friendship association, exists between the users 112a, 112b, then the account processor 122 determines any owing entries between the first user 112a and second user 112b. In this manner, the resolution of transaction data based at least in part on the trust factors associated with the plurality of members can be based on an amount of trust that may exist between at least two members.

In yet another embodiment, the resolution of transaction data based at least in part on the trust factors associated with the plurality of members can be based on determining that a relationship between the first member and the second member is within a preset degree of separation. For example, the account processor 122 utilizes information associated with respective profiles to determine if a relationship between a first user 112a and a second user 112b is within a preset degree of separation, such as a degree of friendship separation of 2, shown by way of reference to FIG. 2, in which profile A has a friend association degree of separation of 2 from profile E, i.e. the friendship association comprising edge 220 and the friendship association comprising edge 234. Thus, for the associated profiles A and E, the degree of friendship separation, determined according to one aspect of one embodiment of the present invention, is "2." Other degrees of separation, and other types of association separation between members can be utilized in accordance with the invention. If a particular degree of separation, such as a degree of friendship separation of two, exists between members, then the account processor 122 determines any owing entries between the first user 112a and second user 112b. In this manner, the resolution of transaction data based at least in part on the trust factors associated with the plurality of members can be based on an amount of trust that may exist between at least two members.

In another embodiment, the resolution of transaction data based at least in part on the trust factors associated with the plurality of members includes a notification to a member entering transaction data that a member associated with the transaction data is a "grave debtor." In this example, a user 112a is notified upon entering transaction data such as a payment entry that another user 112b-n associated with the payment entry owes a preset outstanding amount to one or more users 112a, 112c-n. In other examples, notification can be provided if a user 112a-n owes a preset number of other users 112a-n, owes at least a preset limit related to the outstanding amount owed times the number of users 112a-n owed, owes amounts due for longer than a preset amount of time, or otherwise has a relatively poor or inconsistent record of paying outstanding amounts to one or more users 112a-n. These and other examples indicate that a particular member is designated as a "grave debtor," and notice of that particular member's risk as a "grave debtor" can be provided to a user 112a-n entering transaction data such as a payment entry associated with that particular member. Notice that a particular member is designated as a "grave debtor" can also be provided in other contexts associated with owing entries, or other transactions involving an account. In any event, once the user 112a is notified that a particular member is designated a "grave debtor," then the user 112a can be prompted whether to proceed with entering the payment entry with respect to the member designated as a "grave debtor." If the user 112a desires to proceed with entering transaction data such as a payment entry, the user 112a provides an indication via an input device associated with a client 102a, and the account processor 122 then accepts the user's input and proceeds with resolving the transaction action to determine any owing entries.

In some embodiments, the account processor 122 resolves transaction data based at least in part on the trust factors associated with the plurality of members by determining a proxy payment based on trust factors associated with members. A proxy payment is an owing entry from a first member (a proxy) to a second member to satisfy a debt of a third member to the second member. For example, if the account processor 122 receives transaction data such as a set of payment entries and determines that an owing entry of $10.00 is owed to user 112a by user 112b, and an owing entry of $10.00 is owed to user 112b by user 112c, then the account processor 122 can determine that a proxy payment of $10.00 from user 112c (the proxy) to user 112a could be made. In this example, the proxy payment could cancel both the owing entry of $10.00 from the second user 112b to the first user 112a, and the owing entry of $10.00 from the third user 112c to the second user 112b. In this manner, the number of owing entries is reduced from 2 to 1, thus reducing transaction time between members to resolve the transaction data.

In determining a proxy payment, the account processor 122 also evaluates trust factors associated with members. In the example provided above, if respective trust factors associated with user 112a and user 112c indicate that a particular type of association, such as a friendship association, exists between user 112a and user 112c, then a proxy payment can be determined between user 112a and user 112c. FIG. 2 illustrates such an association, where edge 222 represents a friendship association between profile A at vertex 202 and Profile D at vertex 208. Other types of associations between members or users 112a, 112b can be utilized to determine a proxy payment. In this example, since a particular type of association, such as a friendship association, exists between the users 112a, 112b, then a determination can be made to create a proxy payment between users 112a and 112c. In this manner, user 112a can obtain an amount of confidence based on an amount of trust in the proxy (user 112c) that the proxy (user 112c) could satisfy the proxy payment to user 112a.

In another embodiment, the account processor 122 can notify user 112a that a proxy payment can be made by user 112c (a proxy) to user 112a. Via an account interface displayed by a client 102a, the account processor 122 prompts user 112a whether to accept a proxy payment from user 112c. If user 112a accepts the proxy payment from the other user 112c, then the account processor 122 creates an owing entry for the amount of the proxy payment from the other user 112c to user 112a. Alternatively, the other user 112c (the proxy) could be prompted whether he or she is willing to make a proxy payment to user 112a to resolve transaction data such as a set of payment entries. If the other user 112c is willing to make a proxy payment, then the account processor 122 creates an owing entry for the amount of the proxy payment from the other user 112c to user 112a. In either manner, user 112a can obtain an amount of confidence based on an amount of trust in user 112c (the proxy) that the user 112c could satisfy the proxy payment to user 112a.

A determination that a proxy payment exists can be based on at least one of the following, including but not limited to, comparing a trust factor to a preset value, comparing a trust factor to a threshold, comparing the trust factors to a preset value or threshold, comparing trust ratings associated with each member to a preset value or threshold, receiving an instruction from a member that is receiving a proxy payment that a member making the proxy payment is a trusted member, determining that a relationship between the first member and the second member is a particular type of association, determining that a relationship between the first member and the second member is a friendship association, determining that a relationship between the first member and the second member is within a preset degree of separation, determining that either member has transacted with the other member at a prior time, a user-provided list of conditions, receiving an instruction from a member regarding who the member will or will not transact with, and comparing a trust signal with a predefined value or threshold. In this manner, the determination whether to create a proxy payment between users of a social network can be based on an amount of trust that may exist between members. In many instances, members may want to exchange monetary amounts or items of value through a proxy, and the amount of trust that exists between the members associated with a proxy can affect whether a proxy payment can be made through the proxy to facilitate the exchange.

In some embodiments, the account processor 122 resolves transaction data in a batch process. The account processor 122 can also resolve transaction data continuously, or at a predetermined time frequency such as hourly or daily. In any event, the account processor 122 resolves transaction data based at least in part on the trust factors associated with the plurality of members using information associated with pre-existing profiles and/or accounts stored in the social network account database 130. For example, if an account stored in the social network account database 130 includes an owing entry of $10.00 owed by user 112a to user 112b, then the account processor 122 can resolve transaction data such as new payment entries against the previously stored owing entry. If user 112a enters a payment entry of $20.00 paid on the behalf of user 112b, the payment entry is received and resolved by the account processor 122 against the previously stored owing entry. In this example, a new owing entry is created with an amount of $10.00 owed by user 112b to user 112a. The account processor 122 stores the payment entry and new owing entry in the account stored in the social network account database 130.

In this example, after the account processor 122 resolves transaction data such as payment entries based at least in part on the trust factors associated with the plurality of members, the account processor 122 can notify members of any payment entries, owing entries, and/or proxy payments. Such notifications can be optional depending on a particular member's selection or preference, and can be made upon resolution of transaction data or on a periodic basis in batch form. For example, the account processor 122 can send an immediate e-mail to a user 112a through a client device 102a-n via the network 106 with information associated with a payment entry to inform the user 112a that another user 112b has entered a payment entry in the amount of $10.00 and an amount associated with an owing entry, $10.00, is owed to the other user 112b. In another example, the account processor 122 can send a weekly e-mail to a user 112a with information associated with all payment entries made on the user's behalf, the amounts associated with such payment entries, the amounts owed, if any, to the user 112a, and the amounts owed, if any, to all other users 112b-n.

In another embodiment, the account processor 122 can cause the display of an account interface on a client device 102a-n after resolving payment entries. The account interface can be generated by the account processor 122, and transmitted to the client device 102a-n via the network 106. The client device 102a-n can output or otherwise display the account interface to a user 112a-n. For example, the user 112a can use a keyboard, mouse, or other input device and to click on a link to the account interface. In most instances, the account interface includes identity authentication or password authentication to confirm a user's identity prior to accessing information associated with an account. The account interface can output information, such as transaction data, payment entries, owing entries, proxy payments, and other information associated with an account. For example, when a user 112a logs on to a server 104 via a client device 102a and network 106, an account interface generated by the account processor 122 can notify the user 112a of any payment entries, owing entries, and/or proxy payments. The account interface can provide information associated with a payment entry, an owing entry, and/or proxy payment to inform the user 112a that an amount associated with the payment entry, owing entry, or proxy payment is owed to another member.

In some embodiments, an e-mail, account interface, or other means of providing notification to a member can provide access to a payment system for paying an amount associated with the owing entry or proxy payment is owed to another member. For example, an e-mail to a user 112a can include a link to a payment system associated with an electronic payment service to permit the user 112a to connect to the payment system via the network 106, and make a payment to another member via the electronic payment service. The electronic payment service could then transmit a corresponding payment entry to the account processor 122 via the network 106 for resolution in the next or subsequent payment entry resolution cycle.

In many instances, members may want to exchange monetary amounts or items of value through an account, and the amount of trust that exists between the members can affect whether payment entries can be resolved between members to facilitate the exchange. Other examples of the resolution of transaction data based at least in part on the trust factors associated with the plurality of members exist in accordance with other embodiments of the invention.

General

While the above description contains many specifics, these specifics should not be construed as limitations on the scope of the invention, but merely as exemplifications of the disclosed embodiments. Those skilled in the art will envision any other possible variations that are within the scope of the invention.

The invention claimed is:

1. A computer-implemented method executed by at least one computer system comprising one or more processors, the method comprising:
   (a) receiving bidirectional communication between a first member associated with a first profile and a second member associated with a second profile in a social network;
   (b) establishing a social relationship between the first profile and the second profile based on the bidirectional communication and storing the social relationship as an association in the social network, the association including a type and a level of the social relationship;
   (c) receiving, at the social network, transaction data associated with the first member and the second member, the transaction data indicative of a request to create a monetary account between the first member and the second member that is independent of the social network;
   (d) associating, using the one or more processors, the first member of the social network with a first trust factor that describes a trustworthiness of the first member in the social network and is based on instructions received from the other members of the social network that specify whether the first member is a trusted member of the social network and a degree of separation between the first member and the other members of the social network that provided the instructions, the degree of separation reflecting a strength of relationship between the first member and the other members;
   (e) associating, using the one or more processors, the second member of the social network with a second trust factor that describes a trustworthiness of the second member and is based on the instructions received from the other members of the social network that specify whether the second member is a trusted member of the social network; and
   (f) the one or more processors determining whether to create the monetary account between the first member and the second member to complete a financial transaction associated with the transaction data based on the first trust factor, the second trust factor and by determining that the first member and the second member share a common characteristic, an activity and a community.

2. The method of claim 1, wherein the transaction data comprises at least one of the following: a payment entry, an owing entry, an amount paid by one user on behalf of at least one other user and an amount paid by a group on behalf of at least one other group.

3. The method of claim 1, wherein the instructions received from the other members of the social network that specify whether the first member or the second member is a trusted member of the social network comprise one of the following: a trust rating associated with the first member or the second member received from the other members, a history of transactions between the first member or the second member and the other members, a number of transactions between the first member or the second member and the other members, a quality of transactions between the first member or the second member and the other members and an instruction from another member specifying whether the another member will or will not transact with the first member or the second member.

4. The method of claim 1, wherein (f) determining whether to create the monetary account between the first member and the second member based on the first trust factor and the second trust factor, comprises at least one of the following: comparing either the first trust factor or the second trust factor to a preset value, and determining that either member has transacted with the other member at a prior time.

5. The method of claim 1, further comprising:
   (g) receiving a payment entry from the first member; and
   (h) determining an amount owed by the second member.

6. The method of claim 5, further comprising:
   (i) storing the payment entry and the amount owed in the monetary account.

7. The method of claim 1, further comprising:
   (g) outputting information associated with the monetary account to either the first member or the second member.

8. The method of claim 7, wherein (g) outputting information associated with the monetary account to either the first member or the second member, comprises displaying an amount owed to either the first member or the second member.

9. The method of claim 7, wherein (g) outputting information associated with the monetary account to either the first member or the second member, comprises notifying both members of an amount owed to either the first member or the second member.

10. The method of claim 1, wherein the trust factor associated with the first member or the second member is further based on one of the following: a number of other accounts associated with the first member or the second member, an age of other accounts associated with the first member or the second member, an accessibility of the first member or the second member via e-mail or other communications, a location of the first member or the second member, and a type of association between the first member or the second member and the other members.

11. The method of claim 10, wherein (f) determining whether to create the monetary account between the first member and second member, based on the first trust factor and the second trust factor, comprises at least one of the following: determining that the social relationship between the first member and the second member is a friendship association and determining that the social relationship between the first member and the second member is within a preset degree of separation.

12. The method of claim 1, wherein the first trust factor associated with the first member is further based on the strength of the social relationship between the first member and the other members.

13. The method of claim 1, further comprising closing the monetary account based on determining that at least one of the first member and the second member is inaccessible.

14. The method of claim 1, wherein (f) determining whether to create the monetary account between the first member and the second member based on the first trust factor and the second trust factor, comprises comparing either the first trust factor or the second trust factor to a threshold.

15. The method of claim 1, wherein the particular type of association is a common geography association.

16. The method of claim 1, wherein the instructions received from the other members of the social network include a trust rating associated with a predefined category.

17. A computer-implemented method executed by at least one computer system comprising one or more processors, the method comprising:
(a) receiving bidirectional communication between a first member associated with a first profile and a second member associated with a second profile in a social network;
(b) establishing a social relationship between the first profile and the second profile and storing the social relationship as an association in the social network, the association including a type and a level of the social relationship;
(c) receiving, at the social network, transaction data associated with the first member and the second member, the transaction data indicative of a request to create a monetary account between the first member and the second member that is independent of the social network, wherein the first member and the second member each have an associated trust factor that describes a trustworthiness of each member in the social network and is based, in part, on instructions received from the other members of the social network that specify whether the first member and the second member are trusted members of the social network and a degree of separation between each member and the other members of the social network that provided the instructions, the degree of separation reflecting a strength of relationship between each member and the other members; and
(d) the one or more processors resolving the transaction data based on the trust factors associated with the first member and the second member and by determining that the first member and the second member share a common characteristic, an activity and a community.

18. The method of claim 17, wherein the instructions received from the other members of the social network that specify whether the first member and the second member are trusted members of the social network comprise one of the following: a trust rating received from the other members, a history of transactions between either the first member or the second member and the other members, a number of transactions between either the first member or the second member and the other members, a quality of transactions between either the first member or the second member with the other members and an instruction from a user regarding who the user will or will not transact with.

19. The method of claim 17, wherein (d) resolving the transaction data based on the trust factors associated with the first member and the second member comprises at least one of the following: comparing one of the trust factors to a preset value, comparing one of the trust factors to a threshold and determining that one member has transacted with another member at a prior time.

20. The method of claim 17, wherein the transaction data is associated with at least one of the following: a monetary amount, a foreign monetary amount, a currency type, a foreign currency type, an exchange rate, a unit amount, a unit type, an instruction associated with splitting an amount, a date, a time, a member name and a community name.

21. The method of claim 17, wherein (d) resolving the transaction data based at least in part on the trust factors associated with the first member and the second member, comprises creating a monetary account between the first member and the second member.

22. The method of claim 17, wherein the monetary account includes at least one of the following: a payment entry from at least one member, and an amount owed to another member.

23. The method of claim 17, wherein (d) resolving the transaction data based at least in part on the trust factors associated with the first member and the second member, comprises determining whether a proxy payment can be made by the first member for an amount owed by the second member to a third member.

24. The method of claim 23, further comprising:
(e) receiving a selection from the first member to make the proxy payment to the third member of the social network.

25. The method of claim 23, further comprising:
(e) sending a notification to at least one of the other members regarding the first member making the proxy payment.

26. The method of claim 17, further comprising:
(e) receiving a selection from at least one of the first member and the second member to make a payment to another member of the social network.

27. The method of claim 17, further comprising:
(e) sending a notification to one of the other members regarding making a payment to another member of the social network.

28. The method of claim 17, wherein the trust factor associated with each member is further based on one of the following: a number of other accounts associated with each member, an age of other accounts associated with each member, an accessibility of each member via e-mail or other communications and a location of each member.

29. The method of claim 28, wherein (d) resolving the transaction data based on the trust factors associated with the first member and the second member comprises at least one of the following: determining that the social relationship between the first member and the second member is a friendship association and determining that the social relationship between the first member and the second member is within a preset degree of separation.

30. The method of claim 17, wherein the particular type of association is a common geography association.

31. A non-transitory computer-readable storage medium containing executable program code, comprising:
  (a) program code for receiving bidirectional communication between a first member associated with a first profile and a second member associated with a second profile in a social network;
  (b) program code for establishing a social relationship between the first profile and the second profile and storing the social relationship as an association in the social network, the association including a type and a level of the social relationship;
  (c) program code for receiving, at the social network, transaction data associated with the first member and the second member of the social network, the transaction data indicative of a request to create a monetary account between the first member and the second member that is independent of the social network;
  (d) program code for associating the first member of the social network with a first trust factor that describes a trustworthiness of the first member in the social network and is based on instructions received from the other members of the social network that specify whether the first member is a trusted member of the social network and a degree of separation between the first member and the other members of the social network that provided the instructions, the degree of separation reflecting a strength of relationship between the first member and the other members;
  (e) program code for associating the second member of the social network with a second trust factor that describes a trustworthiness of the second member and is based on the instructions received from the other members of the social network that specify whether the second member is a trusted member of the social network; and
  (f) program code for determining whether to create the monetary account between the first member and the second member to complete a financial transaction associated with the transaction data based on the first trust factor, the second trust factor and determining that the first member and the second member share a common characteristic, an activity and a community.

32. The non-transitory computer-readable medium of claim 31, wherein the transaction data comprises at least one of the following: a payment entry, an owing entry, an amount paid by one user on behalf of at least one other user and an amount paid by a group on behalf of at least one other group.

33. The non-transitory computer-readable medium of claim 31, wherein the instructions received from the other members of the social network that specify whether the first member or the second member is a trusted member of the social network comprise one of the following: a trust rating received from the other members, a history of transactions between the first member or the second member and the other members, a number of transactions between the first member or the second member and the other members, a quality of transactions between the first member or the second member and the other members and an instruction from a user regarding who the user will or will not transact with.

34. The non-transitory computer-readable medium of claim 31, wherein (f) program code for determining whether to create the monetary account between the first member and second member, based on the first trust factor and the second trust factor, comprises program code for at least one of the following: comparing either the first or the second trust factor to a preset value, comparing either the first or the second trust factor to a threshold, comparing the trust factors to a preset value, comparing the trust factors to a threshold, and determining that either member has transacted with the other member at a prior time, a user-provided list of conditions.

35. The non-transitory computer-readable medium of claim 31, further comprising:
  (g) program code for receiving a payment entry from the first member; and
  (h) program code for determining an amount owed by the second member.

36. The non-transitory computer-readable medium of claim 35, further comprising:
  (i) program code for storing the payment entry and the amount owed in the monetary account.

37. The non-transitory computer-readable medium of claim 31, further comprising:
  (g) program code for outputting information associated with the monetary account to either the first member or the second member.

38. The non-transitory computer-readable medium of claim 37, wherein (g) program code for outputting information associated with the monetary account to either the first member or the second member, comprises displaying an amount owed to either the first member or the second member.

39. The non-transitory computer-readable medium of claim 37, wherein (g) program code for outputting information associated with the monetary account to either the first member or the second member, comprises notifying both members of an amount owed to either the first member or the second member.

40. The medium of claim 31, wherein the trust factor associated with the first member or the second member is further based on one of the following: a number of other accounts associated with the first member or the second member, an age of other accounts associated with the first member or the second member, an accessibility of the first member or the second member via e-mail or other communications and a location of the first member or the second member.

41. The medium of claim 40, wherein program code for (f) determining whether to create the monetary account between the first member and second member, based on the first trust factor and the second trust factor, comprises program code for at least one of the following: determining that the social relationship between the first member and the second member is a friendship association and determining that the social relationship between the first member and the second member is within a preset degree of separation.

42. The non-transitory computer-readable medium of claim 31, wherein the particular type of association is a common geography association.

43. The non-transitory computer-readable medium of claim 21, wherein the particular type of association is a common geography association.

44. The non-transitory computer-readable medium of claim 31, wherein the instructions received from the other members of the social network include a trust rating associated with a predefined category.

45. A non-transitory computer-readable storage medium containing executable program code, comprising:
  (a) program code for receiving bidirectional communication between a first member associated with a first profile and a second member associated with a second profile in a social network;
  (b) program code for establishing a social relationship between the first profile and the second profile and storing the social relationship as an association in the social network, the association including a type and a level of the social relationship;

(c) program code for receiving, at the social network, transaction data associated with the first member and the second member, the transaction data indicative of a request to create a monetary account between the first member and the second member that is independent of the social network, wherein the first member and the second member each have an associated trust factor that relates to a trustworthiness of each member and is based on instructions received from the other members of the social network that specify whether the first member and the second member are trusted members of the social network and a degree of separation between each member and the other members of the social network that provided the instructions, the degree of separation reflecting a strength of relationship between each member and the other members; and (d) program code for resolving the transaction data based on the trust factors associated with the first member and the second member and by determining that the first member and the second member share a common characteristic, an activity and a community.

46. The non-transitory computer-readable medium of claim 45, wherein the instructions received from the other members of the social network that specify whether the first member and the second member are trusted members of the social network comprise one of the following: a trust rating received from the other members, a history of transactions between either the first member or the second member and the other members, a number of transactions between either the first member or the second member and the other members, a quality of transactions between either the first member or the second member and the other members and an instruction from a user regarding who the user will or will not transact with.

47. The non-transitory computer-readable medium of claim 45, wherein program code for resolving the transaction data based at least in part on the trust factors associated with the first member and the second member comprises program code for at least one of the following: comparing one of the trust factors to a preset value, comparing one of the trust factors to a threshold and determining that one member has transacted with another member at a prior time, a user-provided list of conditions.

48. The non-transitory computer-readable medium of claim 45, wherein the transaction data is associated with at least one of the following: a monetary amount, a foreign monetary amount, a currency type, a foreign currency type, an exchange rate, a unit amount, a unit type, an instruction associated with splitting an amount, a date, a time, a member name and a community name.

49. The non-transitory computer-readable medium of claim 45, wherein (d) program code for resolving the transaction data based on the trust factors associated with the first member and the second member, comprises creating a monetary account for the first member and the second member.

50. The non-transitory computer-readable medium of claim 49, wherein the monetary account includes at least one of the following: a payment entry from at least one member and an amount owed to another member.

51. The non-transitory computer-readable medium of claim 45, wherein (d) program code for resolving the transaction data based at least in part on the trust factors associated with the first member and the second member, comprises determining whether a proxy payment can be made by the first member for an amount owed by the second member to a third member.

52. The non-transitory computer-readable medium of claim 51, further comprising:
(e) program code for receiving a selection from the first member to make the proxy payment to the third member of the social network.

53. The non-transitory computer-readable medium of claim 51, further comprising:
(e) program code for sending a notification to at least one of the other members regarding the first member making the proxy payment.

54. The non-transitory computer-readable medium of claim 45, further comprising:
(e) program code for receiving a selection from at least one of the first member and the second member to make a payment to another member of the social network.

55. The non-transitory computer-readable medium of claim 45, further comprising:
(e) program code for sending a notification to one of the other members regarding making a payment to another member of the social network.

56. The medium of claim 45, wherein the trust factor associated with each member is further based on one of the following: a number of other accounts associated with each member, an age of other accounts associated with each member, an accessibility of each member via e-mail or other communications, a location of each member, a type of association and a strength of the social relationship between each member and the other members.

57. The medium of claim 56, wherein program code for (d) resolving the transaction data based on the trust factors associated with the first member and the second member comprises program code for at least one of the following: determining that the social relationship between the first member and the second member is a friendship association and determining that the social relationship between the first member and the second member is within a preset degree of separation.

58. A computer-implemented method executed by at least one computer system comprising one or more processors, the method comprising:
(a) receiving bidirectional communication between a first member associated with a first profile and a second member associated with a second profile in a social network;
(b) establishing a social relationship between the first profile and the second profile and storing the social relationship as an association in the social network, the association including a type and a level of the social relationship;
(c) receiving, at the social network, transaction data associated with the first member and the second member, the transaction data indicative of a request to create a monetary account between the first member and the second member that is independent of the social network;
(d) associating, using the one or more processors, the first member of the social network with a first trust factor that describes a trustworthiness of the first member in the social network and is based on a degree of separation between the first member and other members of the social network and instructions received from the other members of the social network that specify whether the first member is a trusted member of the social network and a degree of separation between each member and the other members of the social network that provided the instructions, the degree of separation reflecting a strength of relationship between each member and the other members;

(e) associating, with the one or more processors, the second member of the social network with a second trust factor that describes a trustworthiness of the second member and is based on the instructions received from the other members of the social network that specify whether the second member is a trusted member of the social network;

(f) the one or more processors determining whether to create the monetary account between the first member and the second member to complete a financial transaction associated with the transaction data based on the first trust factor, the second trust factor_and by determining that the first member and the second member share a common characteristic, an activity and a community;

(g) receiving a payment entry from the first member;

(h) determining, with the one or more processors, an amount owed to the second member by the first member; and (i) storing the payment entry and the amount owed to the second member in the monetary account.

59. The method of claim 58, wherein the particular type of association is a common geography association.

60. A computer-implemented method executed by at least one computer system comprising one or more processors, the method comprising:

(a) receiving bidirectional communication between a first member associated with a first profile and a second member associated with a second profile in a social network;

(b) establishing a social relationship between the first profile and the second profile and storing the social relationship as an association in the social network, the association including a type and a level of the social relationship;

(c) receiving, at the social network, transaction data associated with the first member and the second member, the transaction data indicative of a request to create a monetary account between the first member and the second member that is independent of the social network, wherein the first member and the second member each have an associated trust factor that describes a trustworthiness of each member in the social network and is based on instructions received from the other members of the social network that specify whether the first member or the second member is a trusted member of the social network and a degree of separation between each member and the other members of the social network that provided the instructions, the degree of separation reflecting a strength of relationship between each member and the other members;

(d) resolving, using the one or more processors, the transaction data based on the trust factors associated with the first member and the second member, determining that the first member and the second member share a common characteristic, an activity and a community and determining whether a proxy payment can be made by a third member of the other members for an amount owed by the first member to the second member;

(e) receiving a selection from the third member to make the payment to the second member of the social network; and (f) sending a notification to at least one of the other members regarding the third member making the payment.

61. The method of claim 60, wherein the particular type of association is a common geography association.

* * * * *